(12) United States Patent
Borg et al.

(10) Patent No.: US 10,159,359 B2
(45) Date of Patent: Dec. 25, 2018

(54) ARTICLE FEED DEVICE

(71) Applicant: HL Display AB, Nacka Strand (SE)

(72) Inventors: Martin Borg, Täby (SE); Isak Åberg, Stockholm (SE)

(73) Assignee: HL DISPLAY AB, Nacka Strand (SE)

( * ) Notice: Subject to any disclaimer, the term of this patent is extended or adjusted under 35 U.S.C. 154(b) by 0 days.

(21) Appl. No.: 16/027,899

(22) Filed: Jul. 5, 2018

(65) Prior Publication Data

US 2018/0310724 A1   Nov. 1, 2018

Related U.S. Application Data

(63) Continuation of application No. 15/194,673, filed on Jun. 28, 2016.

(30) Foreign Application Priority Data

Jul. 15, 2015 (EP) ..................... 15176386

(51) Int. Cl.
| A47F 1/12 | (2006.01) |
| A47F 5/00 | (2006.01) |
| B65G 1/02 | (2006.01) |
| B65G 39/12 | (2006.01) |
| B65G 13/11 | (2006.01) |

(52) U.S. Cl.
CPC .............. *A47F 1/12* (2013.01); *A47F 5/0043* (2013.01); *B65G 1/023* (2013.01); *B65G 13/11* (2013.01); *B65G 39/12* (2013.01)

(58) Field of Classification Search
CPC ......... B65G 13/11; B65G 13/12; B65G 39/12
USPC ............... 211/1.57, 36, 86.01, 119.003, 134; 193/35 R
See application file for complete search history.

(56) References Cited

U.S. PATENT DOCUMENTS

| 5,111,942 A | 5/1992 | Bernardin |
| 2010/0072152 A1 | 3/2010 | Kim |
| 2011/0186401 A1* | 8/2011 | Brugmann ............... A47F 1/125 |
| | | 193/37 |

FOREIGN PATENT DOCUMENTS

WO   2010108829   9/2010

OTHER PUBLICATIONS

Martin Jacquemin, European Search Report, parent EP Application serial No. 15176386.9, dated Jan. 20, 2016, European Patent Office, The Hague, Netherlands.

* cited by examiner

*Primary Examiner* — Gene O Crawford
*Assistant Examiner* — Lester III Rushin
(74) *Attorney, Agent, or Firm* — Babcock IP, PLLC

(57) ABSTRACT

An article feed device for feeding articles along a feeding direction towards a front edge of a shelf being provided with the article feed device. A least one roller carrier has a longitudinal extension which is parallel to the feeding direction and comprises a number of roller receiving seats for rotationally receiving the rollers. The roller carrier is arranged to be longitudinally inserted in the profile rails for fixation of the rollers. The roller carrier comprises end stops for preventing relative longitudinal displacement between the roller carrier and the first profile rails when mounted. The roller carrier is divided into at least two section arranged one after the other in the longitudinal direction. Each section is arranged to be inserted from a respective longitudinal end of the first profile rails and comprising cooperating snap engagement means for mutual engagement of one section to the other.

18 Claims, 7 Drawing Sheets

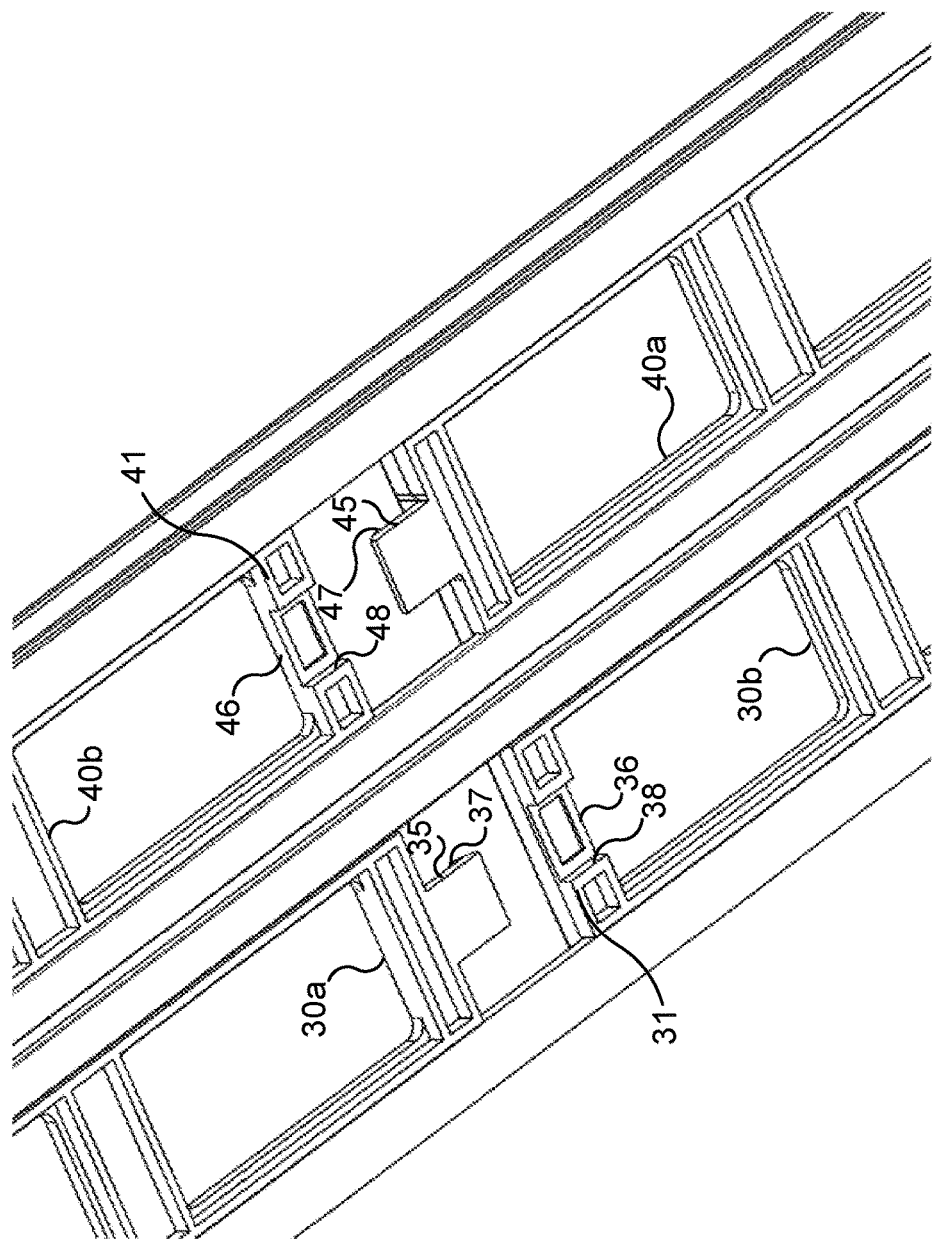

ARTICLE FEED DEVICE

TECHNICAL FIELD

The invention relates generally to an article feed device for feeding articles along a feeding direction towards a front edge of a shelf. More specifically, the invention relates to such a device comprising a plurality of rollers being arranged to support a row of articles arranged one after the other on a shelf for allowing the articles to be fed at a low friction.

BACKGROUND

Article feed devices comprising a plurality of rollers are sometimes referred to as roller tracks. Such devices are frequently used in convenience stores, supermarkets and the like for allowing a row of articles, such as bottles, cigarette packages and may other types of packages and products to be automatically forwarded to the front edge of a shelf when a front most article has been removed from the shelf. By this means the front most article of the row is always positioned at the front edge of the shelf, where it is clearly visible and easy to grab.

The article feed devices are normally placed on top of the shelf and fixed thereto. Quite frequently the article feed devices form part of a shelf accessory system comprising different types of shelf accessories, such as shelf dividers, pusher devices, holders for paper and electronic labels and the like. Normally, such a system also comprises a front fixation device which may be fixed along a front edge of the shelf and which comprises engagement means cooperating with the various accessories for fixation of the accessories, including article feed devices, to the shelf.

The article feed devices may, in some instances, be arranged at the shelf with an inclined angle to the horizontal, such that articles placed on the rollers are feed forwardly towards the front edge of the shelf by gravity acting on the articles. In other instances the article feed devices may be arranged horizontally and arranged in cooperation with a pusher device, such as a spring biased pusher which contacts the rearmost article of a row and urges the row forwardly.

PRIOR ART

WO 2009/075409 A1 discloses an article feed device comprising an elongate U-shaped roller plate with a plurality of fitting groves arranged at each longitudinal side of the plate, for receiving a plurality of transversely arranged rollers. The article feed device further comprises two fixing frames in the from of profiled elements which are arranged at a respective longitudinal side of the roller plate for holding the rollers in position and a pair of end caps which are inserted between the two fixing frames at a respective end of the device. The fixing frames are fixed to the end caps by means of fixation screws extending laterally through the fixing frames and into the end caps for maintaining the various components of the device in position.

EP2 545 813 B9 discloses an article feed device comprising an elongate roll carrier and a plurality of rollers being supported by the roll carrier. The roll carrier comprises two fixation sections formed integral with the roll receiving portion, at a respective longitudinal end of the roll carrier, for fixation of the device to a shelf. The device further comprises two profile rails arranged along a respective longitudinal side of the roll carrier for maintaining the rollers in position. The profile rails and/or the roll carrier are provided with at least three catch means for allowing the profile rails to be laterally clip fitted onto the roll carrier.

EP 2 353 458 B1 discloses an article feed device comprising an elongate roller carrier which supports a plurality of rollers. The roller carrier comprises an integrally formed first end cap arranged at one end of the roller carrier. The device further comprises two profile rails arranged along a respective longitudinal side for maintaining the rollers in position. When assembled, the roller carrier is inserted longitudinally into the two profile rails until the first end cap makes contact with corresponding end surfaces of the two profile rails. Thereafter a second, separate end cap is inserted into the opposite ends of the two profile rails. Finally, the first and second end caps are fixed in position by deforming respective lugs arranged at the profile rails until the lugs engages the end caps.

SUMMARY

An object of the present invention is to provide an enhanced article feed device.

Another object is to provide such a device which is easy to assemble.

Still another object is to provide such a device which requires only a low number of constituent components.

One further object is to provide such a device which may easily be configured for different applications.

Yet an object is to provide such a device which may readily be produced at a low cost.

These and other objects are achieved with an article feed device as set out in the preamble of claim 1, which device exhibits the special technical features specified in the characterizing portion of said claim.

The article feed device according to the invention is arranged for feeding articles along a feeding direction towards a front edge of a shelf being provided with the article feed device. The article feed device comprises at least one set of rollers arranged transversely to the feeding direction. At least one roller carrier has a longitudinal direction which is parallel to the feeding direction and comprises a number of roller receiving seats arranged at each longitudinal side of the carrier for rotationally receiving the rollers. At least two first profile rails are arranged along a respective longitudinal side of the roller carrier. The roller carrier is arranged to be longitudinally inserted in the profile rails for fixation of the rollers. The roller carrier comprises end stops for preventing relative longitudinal displacement between the roller carrier and the first profile rails when mounted. The roller carrier is divided into at least two sections arranged one after the other in the longitudinal direction, each section being arranged to be inserted from a respective longitudinal end of the first profile rails and comprising cooperating snap fit means for mutual engagement of one section to the other.

By this means, the entire article feed device may readily be assembled by simply placing the rollers in the roller carrier sections, inserting the sections into respective ends of the profile rails and pushing the sections towards each other until they are snap fitted together. Hence, the device may be completely assembled without the need for any additional fixation means such as screws, adhesive or the like and also without the need for any additional fixation operations such as cutting out and deforming fixation lugs at the profile rails.

The end stops may be formed integral with a respective section.

The snap fit means may comprise a resilient hook arranged at one section and a recess arranged at another section.

The article feed device may comprise a roller carrier unit with at least two roller carriers being mutually attached side by side, wherein each roller carrier is divided into at least two sections arranged one after the other in the longitudinal direction.

The roller carrier unit may then exhibit a longitudinal slit arranged between each two adjacent roller carriers and a second profile rail may be arranged in said slit, such that the second profile rail receives a longitudinal side of a respective roller carrier.

The roller carriers of the roller carrier unit may be mutually attached side by side at a free longitudinal end of the respective sections.

The sections arranged at each longitudinal end of the roller carrier unit may be formed as a single integral component.

The end stops may be arranged at a free end of each section.

The end stops may protrude laterally beyond a respective longitudinal side of the roller carrier, thereby forming a stop surface for a respective profile rail.

At least one free end of the roller carrier may be provided with a fixation means arranged to be engaged with an accessory fixation device arranged at the shelf for fixation of the article feed device to the shelf.

The end stops may be formed integral with a respective fixation means.

The cross section of the first profile rails may be generally L-, J- or C-shaped.

The cross section of second profile element may be generally T- or H-shaped.

The roller carriers and the rollers may be formed of polymer material.

The profile rails may be formed of aluminium.

Further objects and advantages of the invention appear from the following description of embodiments and from the appended claims.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 4a is a perspective view from below showing a detail of the article feed device shown in FIGS. 1a-b, during assembly

DETAILED DESCRIPTION

Figure 1A:
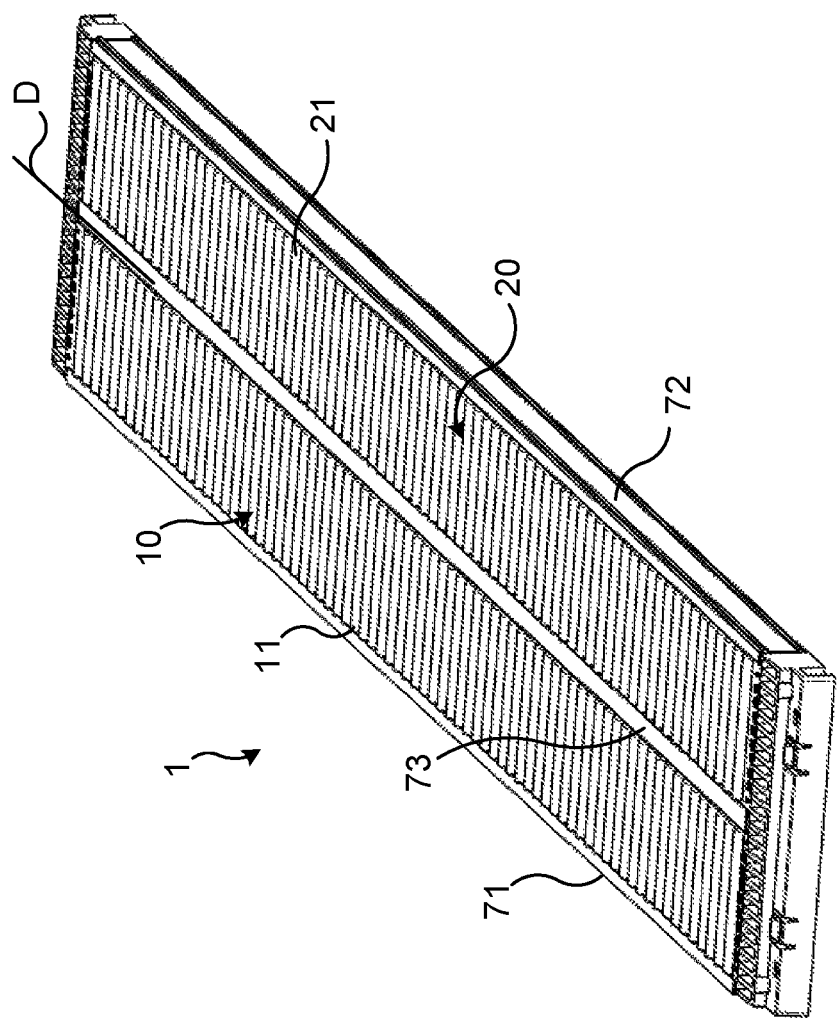
FIG. 1a is a perspective view from above of an article feed device according to an embodiment of the invention and FIG. 1b is a corresponding perspective view from below.
Figure 1B:
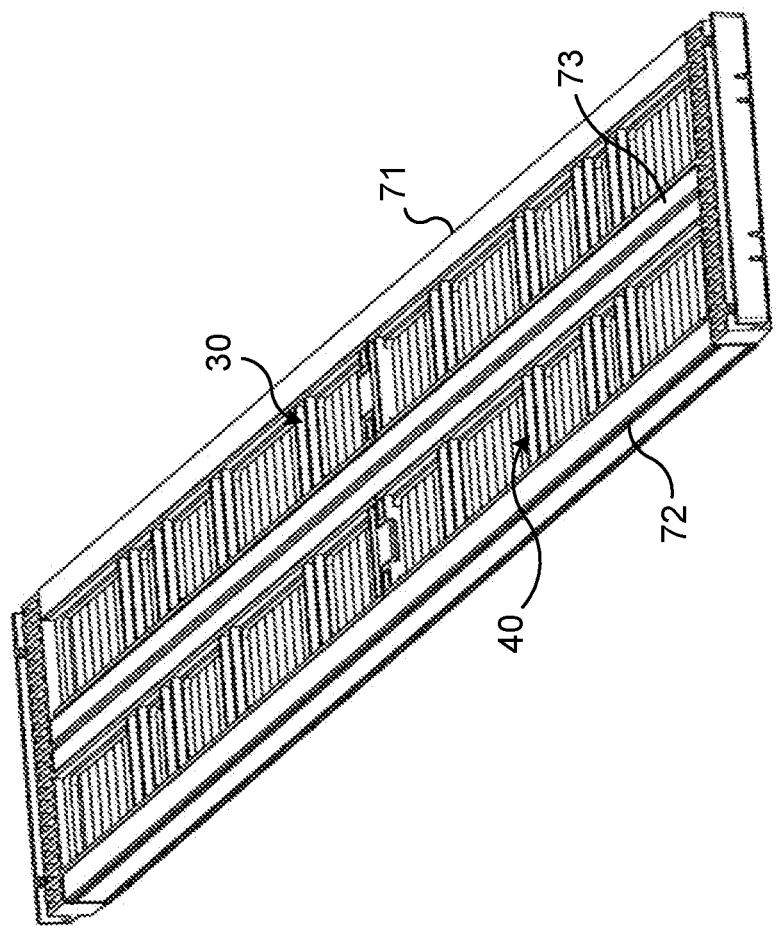

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIGS. 1a-4b illustrates a first embodiment of the article feed device according to the invention. The article feed device 1 is generally elongated and exhibits a longitudinal direction D. According to this embodiment, the article feed device 1 comprises two sets 10, 20 of rollers 11, 21, each set comprising a plurality of rollers. The rollers 11, 21 are arranged perpendicular to the longitudinal axis D. In each set 10, 20 of rollers the rollers 11, 21 are arranged one after the other in the longitudinal direction D. The two sets 10, 20 of rollers thus extend in parallel with each other and with the longitudinal direction D. Each roller 11, 21 comprises a cylindrical article supporting portion 12, 22 and two axle journals 13, 23 which are protruding axially from respective end surfaces of the article supporting portions 12, 22 (see FIG. 3b).

Each set 10, 20 of rollers is supported by a respective roller carrier 30, 40. Each roller carrier 30, 40 comprises an apertured bottom wall 31, 41 and two side walls 32, 33, 42, 43. The side walls 32, 33, 42, 43 are provided with a plurality of upwardly open recesses which form roller receiving seats 34, 44. The axle journals 13, 23 are supportingly received in respective roller receiving seats 34, 44, such that the rollers 11, 21 are rotatably supported by the respective roller carrier 30, 40.

Figure 2:
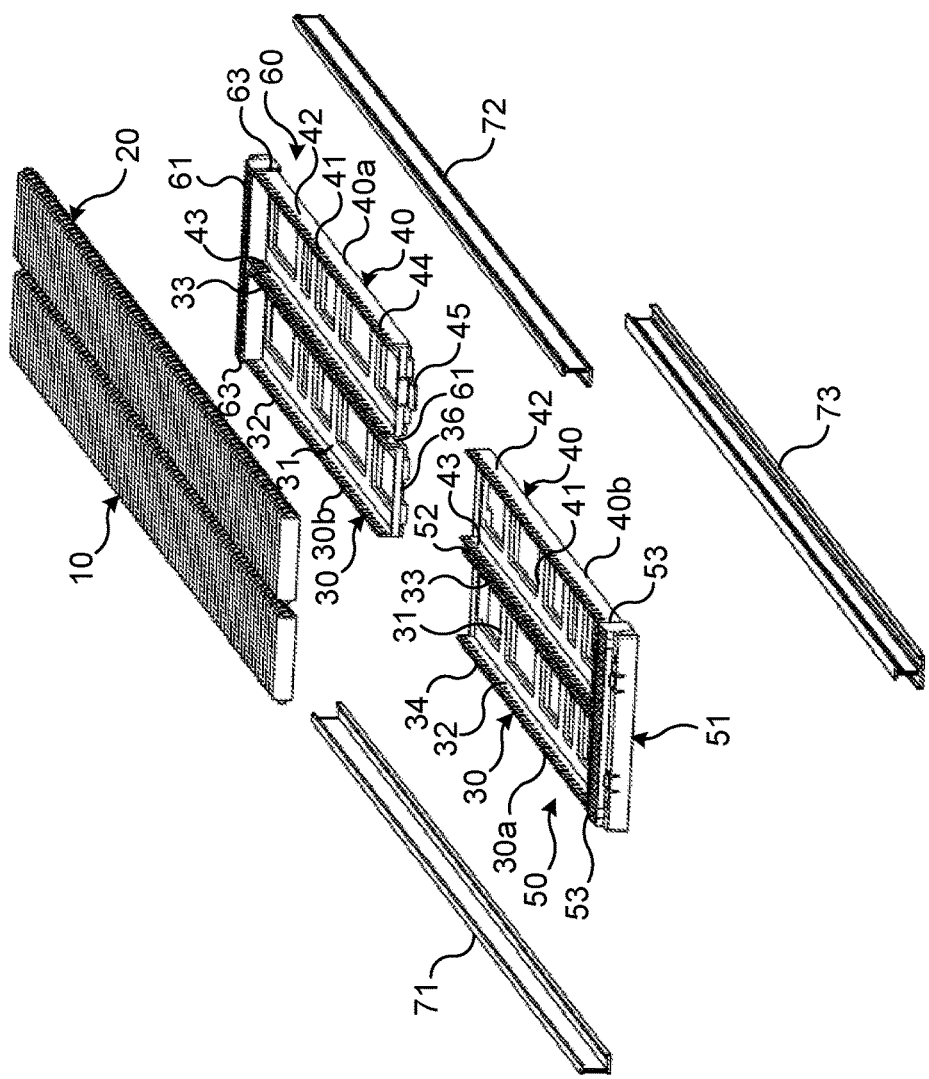
FIG. 2 is an exploded perspective view of the article feed device shown on FIGS. 1a and 1b.

As best seen in FIG. 2, each roller carrier 30, 40 is divided into two sections 30a, 30b, 40a, 40b. The two sections 30a, 30b, 40a, 40b of each roller carrier 30, 40 are arranged coaxially one after the other in the longitudinal direction D. The two sections 30a, 40b arranged at one longitudinal end are joined together by means of first end portion 51 which forms a fixing means for engagement with an accessory fixation device (not shown) arranged on a shelf (not shown). The two sections 30a, 40b and the first end portion 51 are formed integrally by injection moulding and thus form an integral part 51. A first slit 52 is arranged between the sections 30a, 40b and extends longitudinally from the first end portion 51.

Correspondingly, the sections 30b, 40a arranged at the other longitudinal end are joined together by means of a second end portion 61 which forms a fixing means for engagement with an accessory fixation device (not shown) arranged on a shelf (not shown). These two sections 30b, 40a and the second end portion 61 are also formed integrally by injection moulding and form an integral part 60. A second slit 62 is arranged between the sections 30b, 40a and extends longitudinally from the second end portion 61, in the direction toward the first end portion 51.

By this means, the two roller carriers 30, 40 form a roller carrier unit comprising two roller carrier unit sections 50, 60. The first roller carrier unit section 50 comprises the first roller carrier sections 30a, 40b and the first end portion 51 and the second roller carrier unit 60 section comprises the second roller carrier sections 30b, 40a and the second end portion 61.

Each end portion 51, 61 are provided with two end stops 53, 63 which protrude laterally beyond a respective side wall 32, 42.

Figure 4B:
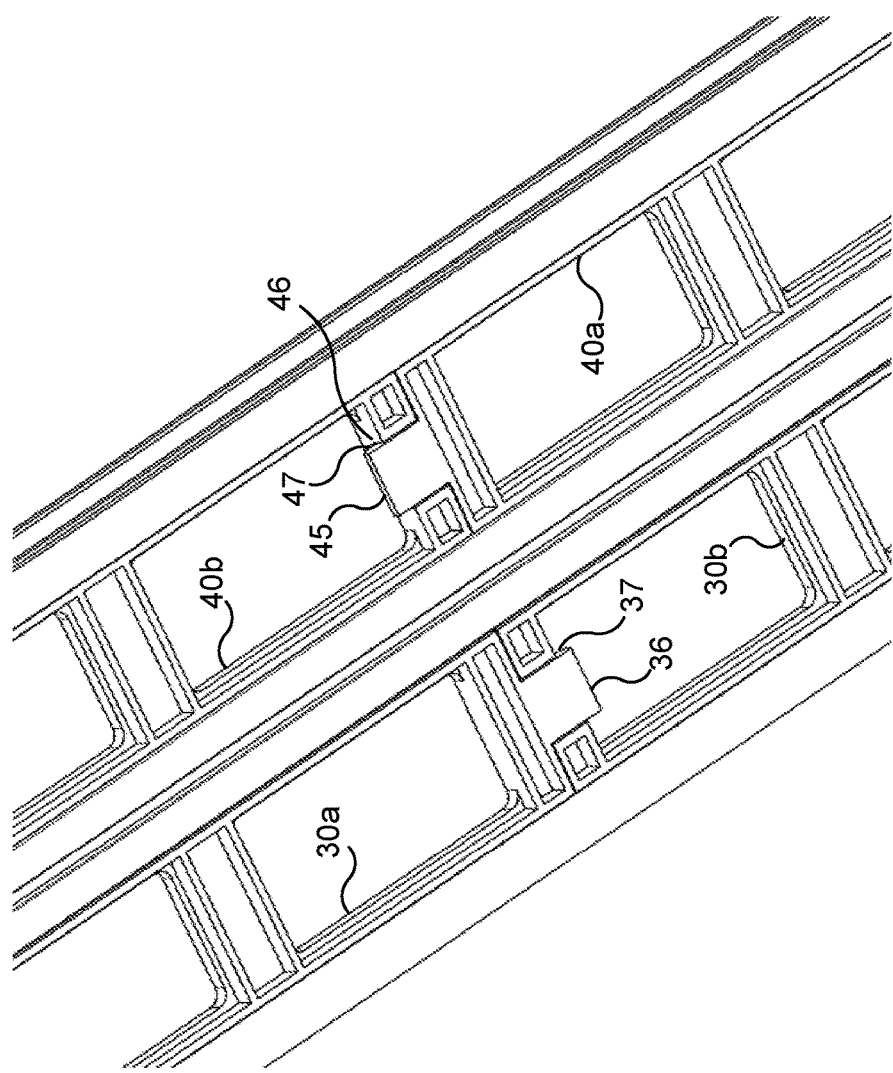
FIG. 4b is a corresponding view of the device after assembly.

The two roller carrier sections 30a, 30b are provided with cooperating snap engagement means 35, 36. As best seen in FIGS. 4a and 4b, at this embodiment, the roller carrier section 30a is provided with a resilient snap hook 35 and the section 30b is provided with a snap engagement surface 36. The snap hook 35 and the snap engagement surface 36 are arranged at the longitudinal ends of the sections 30a, 30b, which ends fasces each other when assembled. The snap engagement surface 36 is arranged in proximity to a recess 38 arranged in the bottom surface of the bottom wall 31, such that the snap hook 35 may pass the bottom surface 31 and a tip 37 of the hook 36 may engage the snap engagement surface, when the to sections 30a, 30b are pushed longitudinally toward each other.

Correspondingly, the two roller carrier sections 40a, 30b are provided with cooperating snap engagement means 45, 46. The roller carrier section 40a is provided with a resilient snap hook 45 and the section 40b is provided with a snap engagement surface 46. The snap hook 45 and the snap engagement surface 46 are arranged at the longitudinal ends of the sections 40a, 40b, which ends fasces each other when assembled. The snap engagement surface 46 is arranged in proximity to a recess 48 arranged in the bottom surface of the bottom wall 41, such that the snap hook 45 may pass the bottom surface 41 and a tip 47 of the hook 46 may engage the snap engagement surface, when the to sections 30a, 30b are pushed longitudinally toward each other.

The article feed device further comprises two first profile rails 71, 72. As best seen in FIG. 3b the first profile rails have a generally L-shaped cross section, which cross section comprises a vertical portion 71a, 72a, a lower horizontal leg 71b, 72b with and upwardly protruding flange 71c, 72c and an upper horizontal flange 71d, 72d, which protrudes from the vertical portion 71a, 72a in the same direction as the lower leg 71b, 72b. The distance between the lower leg 71b, and the upper flange 71d, 72d is essentially equal to the combined height of the roller carriers' 30, 40 bottom wall 31, 41 and side walls 32, 33, 42, 43 at each side of the roller carriers.

The outer side walls 32, 42 of the roller carriers 30, 40 may thus be received in a respective first profile rail 71, 72. When so inserted, the upper flange 71d, 72d closes the roller receiving seats 34, 44 thereby preventing the axle journals 13, 23 and the rollers from escaping from the roller carriers 30, 40. When the side walls 32, 42 are received in the profile rails 71, 72 the upwardly protruding flange 71c, 72c engages a corresponding groove 31a, 41 in lower surface of the bottom wall 31, 41, thereby maintaining the profile rails 71, 72 in engagement with the respective roller carrier 30, 40.

Figure 3A:
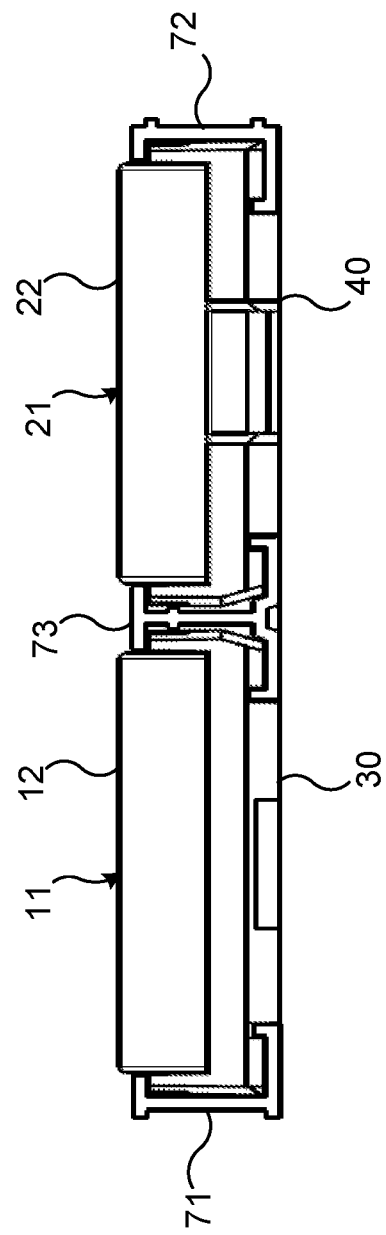
FIG. 3a is a cross section of the article feed device shown in FIGS. 1a and 1b and FIG. 3b is a corresponding exploded cross section.
Figure 3B:
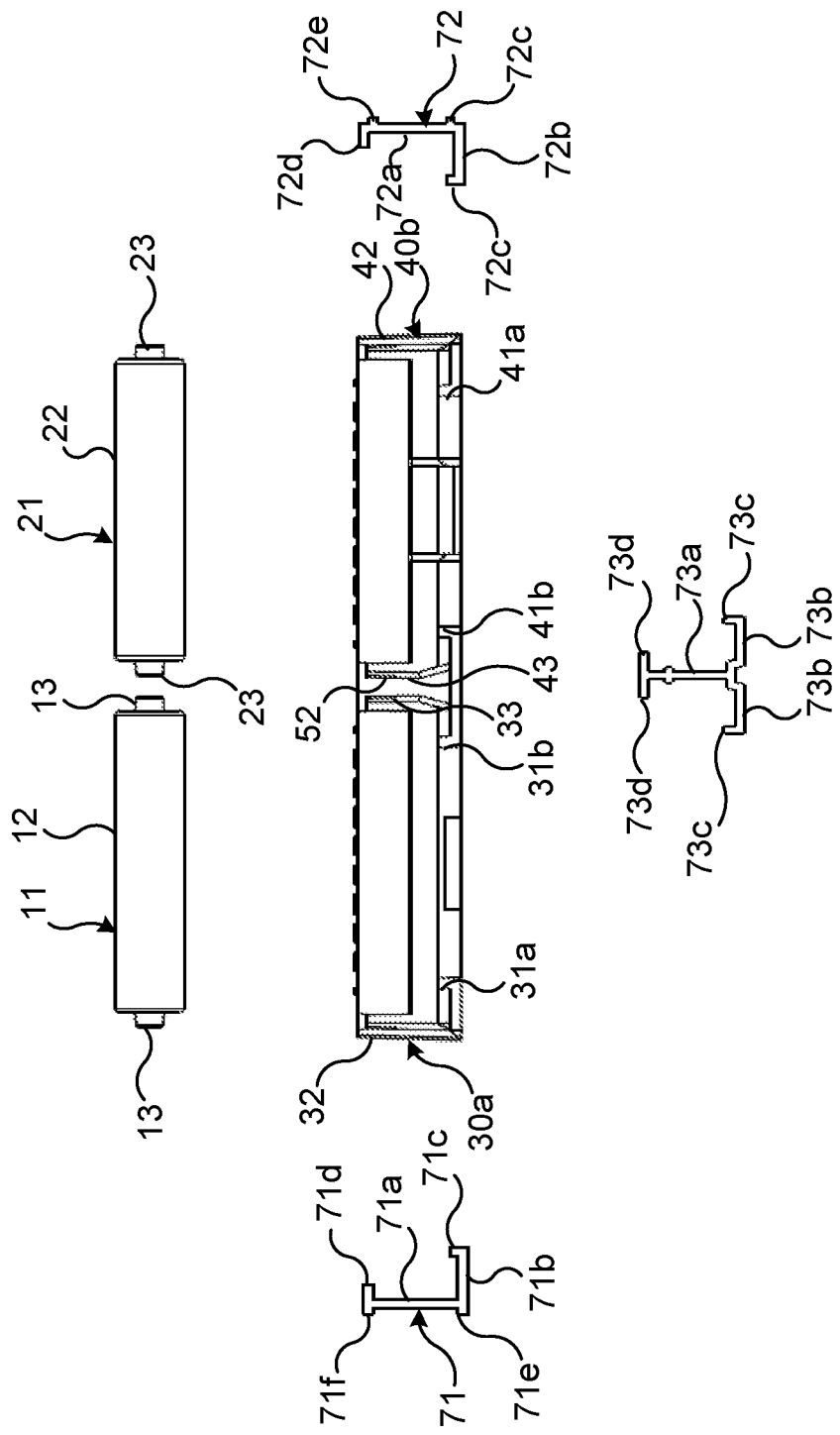

As best seen in FIGS. 3a-b, the first profile rails 71, 72 further comprises laterally projecting flanges. The left hand (as seen in FIGS. 3a-b) first profile rail 71, comprises two flanges 71e, 71f which project horizontally in the opposite direction compared to leg 71b and flange 71d. Correspondingly, the right hand first profile rail 72, comprises two flanges 72e, 72f which project horizontally in the opposite direction compared to leg 72b and flange 72d. The inner distance between flanges 71e and 71f is essentially equal to the outer distance between flanges 72e and 72f. When two article feed devices 1 are arranged side by side on a shelf the flanges 72e, 72f of one article feed device are engaged between flanges 71e, 71f of the adjacent article feed device.

By this means the two article feed devices are interlocked in the vertical direction such as to enhance the stability of the article feed installation.

The article feed device further comprises a second profile rail 73. The cross section of the third profile rail 73 is formed generally as two first profile rails being joined together back to back. The cross section of second profile rail 73 thus comprises a vertical portion 73a, two horizontal legs 73b facing away from each other and being provided with a respective upwardly protruding vertical flange 73c and two upper horizontal flanges 73d facing away from each other. The second profile rail 73 may be longitudinally inserted into the slits 52, 62, in order thereby to close the roller receiving seats 34, 44 arranged in the side walls 33, 43 for maintaining the axle journals 13, 23 in position. The upwardly protruding flanges 73a also engages corresponding grooves 31b, 41b arranged in the bottom walls 31, 41, for maintaining the second profile rail in engagement with the roller carriers 30, 40.

The first 71, 72 and second 73 profile rails are, at the shown example, formed of extruded aluminium. It is however also possible to form these components from other materials and by other methods, such as e.g. by injection moulding or extrusion of polymer materials or by bending metal.

When the components described above are to be assembled into the article feed device 1, the rollers 11, 21 are first positioned in the roller receiving seats 34 of both roller carriers 30, 40. Thereafter the two roller carrier unit sections 50, 60 are brought into engagement with the first 71, 72 and second 73 profile rails. This is done by inserting the ends provided with snap engagement means 35, 36 into respective ends of the profile rails 71, 72, 73. The two roller carrier unit sections 50, 60 are thereafter pushed towards each other (see FIG. 4a) until the snap hooks 35, 45 are brought into engagement with the respective snap engagement surface 36, 46. At this moment (see FIG. 4b) the assembly of the article feed device is completed and the constituent components are locked in position. The profile rails 71, 72, 73 are engaged with the roller carriers 30, 40 and prevents the rollers 11, 21 from leaving their respective roller receiving seats 34. Additionally the laterally protruding end stops 53, 63 restrict or prevent relative axial displacement between the roller carriers 30, 40 and the first profile rails 71, 72. Correspondingly, the end portions 51, 61 closes the slits 52, 62 in the longitudinal direction, such that the second profile rail may not be essentially displaced relative to the roller carriers 30, 40.

The inventive article feed device thus allows for a very simple assembly requiring no additional fixation components or additional operations for securing the components of the assembly.

When the article feed device is to be disassembled it suffices to release the snap hooks 35, 45 from their respective snap engagement surfaces 36, 46.

Thereafter the roller carrier unit sections 50, 60 may be longitudinally removed from each other and withdrawn out of the profile rails 71, 72, 73.

As described above, the exemplifying article feed device shown in the drawings, comprises two roller carriers 30, 40 and two sets of rollers 10, 20. A particular advantage of this embodiment is that the two roller carrier unit sections 50, 60 may be identically designed. When the roller carrier unit sections are produced by injection moulding, this provides for that one single moulding tool may be utilized for forming both roller carrier unit sections.

However, the article feed device may comprise any desired number of roller carriers and a corresponding number of roller sets. The article feed device may, e.g. comprise one single set of rollers and one single roller carrier divided into two, longitudinally separable sections. At such embodiments the second profile rail is omitted. Preferably at such embodiments, the snap engagement means are formed such that both roller carrier sections may be made identical. For instance each roller carrier section may comprise both a male and a female snap engagement means arranged side by side, such as a resilient hook and a recess with an engagement surface.

The article feed device may alternatively comprise three, four or any other number of roller carriers attached side by side and divided into two sections.

At the shown example, the roller carrier unit is divided into two identical sections, each section constituting one half of the entire roller carrier unit.

However, the sections need not to have equal length. One section may be somewhat or even much longer than the other.

At another embodiment which is not shown, the roller carrier or a roller carrier unit comprising two or more roller carriers attached side by side, may be divided into more that two sections, e.g. into three, four or more sections. At such instances each roller carrier or roller carrier section is, at both longitudinal ends, provided with cooperating snap engagement means such that they may be snapped together longitudinally to form a continuous roller carrier or roller carrier unit. Such embodiments may be particularly advantageous when it is desired to allow adaptation of the length of the article feed device, e.g. on site in connection with installation. The roller carrier device may then be delivered unassembled and the profile rails may be designed cuttable such the length of the profile rails may be adapted to the desired number of roller carrier sections or roller carrier unit sections.

At the shown example, the cross sections of the first profile rails 71, 72 are generally L-shaped. These cross sections may however also have may other general shapes. They may e.g. be U-, C- or J-shaped. Correspondingly, the second profile rail may have many other cross section geometries than T-shape, e.g. a general H- or I-shape.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An article feed device for feeding articles along a feeding direction towards a front edge of a shelf being provided with the article feed device, which article feed device is prepared by a process comprising the steps of;
providing at least one set of rollers arranged transversely to the feeding direction;
providing at least two first profile rails;
forming two sections, each of the sections as an integral part, via injection molding; the at least two sections arranged one after the other in the longitudinal direction, each section arranged to be inserted from a respective longitudinal end of the first profile rails and comprising cooperating snap engagement means for mutual engagement of one section to the other to form a roller carrier;
the roller carrier having a longitudinal extension which is parallel to the feeding direction and comprising a number of roller receiving seats arranged at each longitudinal side of the carrier for rotationally receiving the rollers;
arranging the first profile rails along a respective longitudinal side of the roller carrier for fixation of the rollers; and
the sections each formed integrally during the injection molding with end stops which protrude laterally beyond a side wall of the roller carrier, preventing relative longitudinal displacement between the roller carrier and the first profile rails when the sections are joined by the snap engagement means.

2. An article feed device according to claim 1, wherein the snap engagement means comprises a resilient hook arranged at one section and a snap engagement surface arranged at another section.

3. An article feed device according to claim 1, comprising a roller carrier unit with at least two roller carriers being mutually attached side by side, wherein each roller carrier unit is divided into at least two roller carrier unit sections arranged one after the other in the longitudinal direction.

4. An article feed device according to claim 3, wherein the roller carrier unit exhibits a longitudinal slit arranged between each two adjacent roller carriers and a second profile rail which is arranged in said slit and which receives a longitudinal side of a respective roller carrier.

5. An article feed device according to claim 3, wherein the roller carriers of the roller carrier unit are mutually attached side by side at a free longitudinal end of the respective sections.

6. An article feed device according to claim 1, wherein the end stops are formed at a free end of each roller carrier section.

7. An article feed device according to claim 6, wherein the end stops protrude laterally beyond a respective longitudinal side of the roller carrier, thereby forming a stop surface for a respective profile rail.

8. An article feed device according to claim 1, wherein at least one free end of the roller carrier is provided with a fixation means arranged to be engaged with an accessory fixation device arranged at the shelf for fixation of the article feed device to the shelf.

9. An article feed device according to claim 8, wherein the end stops are formed integral with a respective fixation means.

10. An article feed device according to claim 1, wherein the cross section of the first profile rails are generally L-, J-, U- or C-shaped.

11. An article feed device according to claim 4, wherein the cross section of the second profile rail is generally T- or H-shaped.

12. An article feed device according to claim 1, wherein the roller carriers and the rollers are formed of polymer material.

13. An article feed device according to claim 1, wherein the profile rails are formed of aluminium.

14. A method for manufacture of an article feed device for feeding articles along a feeding direction towards a front edge of a shelf being provided with the article feed device, comprising the steps of;
providing at least one set of rollers arranged transversely to the feeding direction;
providing at least two first profile rails;
forming two sections, each of the sections as an integral part, via injection molding; the at least two sections arranged one after the other in the longitudinal direction, each section arranged to be inserted from a respective longitudinal end of the first profile rails and comprising cooperating snap engagement means for mutual engagement of one section to the other to form a roller carrier;

the roller carrier having a longitudinal extension which is parallel to the feeding direction and comprising a number of roller receiving seats arranged at each longitudinal side of the carrier for rotationally receiving the rollers;

arranging the first profile rails along a respective longitudinal side of the roller carrier for fixation of the rollers; and the sections each formed integrally during the injection molding with end stops which protrude laterally beyond a side wall of the roller carrier, preventing relative longitudinal displacement between the roller carrier and the first profile rails when the sections are joined by the snap engagement means.

15. The method of claim 14, wherein the roller carrier is divided into at least two roller carrier unit sections arranged one after the other in the longitudinal direction.

16. The method of claim 15, wherein the roller carrier unit exhibits a longitudinal slit arranged between each two adjacent roller carriers and a second profile rail which is arranged in said slit and which receives a longitudinal side of a respective roller carrier.

17. The method of claim 15, wherein the roller carriers of the roller carrier unit are mutually attached side by side at a free longitudinal end of the respective sections.

18. The method of claim 14, wherein the end stops are formed at a free end of each section.

* * * * *